US009759079B2

(12) United States Patent
Sippel et al.

(10) Patent No.: US 9,759,079 B2
(45) Date of Patent: Sep. 12, 2017

(54) SPLIT LINE FLOW PATH SEALS

(71) Applicants: Rolls-Royce Corporation, Indianpolis, IN (US); Rolls-Royce North American Technologies, Inc., Indianapolis, IN (US); Rolls-Royce High Temperature Composites, Inc., Huntington Beach, CA (US); Rolls-Royce plc, London (GB)

(72) Inventors: Aaron D. Sippel, Zionsville, IN (US); Ted J. Freeman, Danville, IN (US); David J. Thomas, Brownsburg, IN (US); Joseph P. Lamusga, Indianapolis, IN (US); Brian J. Shoemaker, Indianapolis, IN (US); Steven Hillier, Manchester (GB)

(73) Assignees: Rolls-Royce Corporation, Indianapolis, IN (US); Rolls-Royce North American Technologies Inc., Indianapolis, IN (US); Rolls-Royce High Temperature Composites Inc., Cypress, CA (US); Rolls-Royce plc, London (GB)

( * ) Notice: Subject to any disclaimer, the term of this patent is extended or adjusted under 35 U.S.C. 154(b) by 292 days.

(21) Appl. No.: 14/723,909

(22) Filed: May 28, 2015

(65) Prior Publication Data

US 2016/0348521 A1    Dec. 1, 2016

(51) Int. Cl.
F01D 11/00    (2006.01)
F01D 25/26    (2006.01)
(Continued)

(52) U.S. Cl.
CPC ............ *F01D 11/005* (2013.01); *F01D 5/225* (2013.01); *F01D 5/24* (2013.01); *F01D 9/04* (2013.01);
(Continued)

(58) Field of Classification Search
CPC .......... F01D 11/005; F01D 5/225; F01D 5/24; F01D 9/04; F01D 11/008; F01D 25/246;
(Continued)

(56) References Cited

U.S. PATENT DOCUMENTS

| 1,423,466 A | 7/1922 | Snyder |
| 3,375,016 A | 3/1968 | Jellinek et al. |

(Continued)

FOREIGN PATENT DOCUMENTS

| JP | 5776208 A | 5/1982 |
| JP | 58176402 A | 10/1983 |
| JP | 2000204901 A | 7/2000 |

OTHER PUBLICATIONS

Extended European Search Report, European Application No. 16168849.4-1610, dated Nov. 18, 2016, 5 pages.
(Continued)

*Primary Examiner* — Dwayne J White
*Assistant Examiner* — Aaron R Eastman
(74) *Attorney, Agent, or Firm* — Barnes & Thornburg LLP

(57) ABSTRACT

A gas turbine engine assembly adapted to separate a high pressure zone from a low pressure zone includes a seal assembly configured to block gasses from passing through the interface of two adjacent components. The seal assembly includes a rod.

16 Claims, 4 Drawing Sheets

(51) Int. Cl.
  *F01D 5/22* (2006.01)
  *F01D 5/24* (2006.01)
  *F01D 9/04* (2006.01)
  *F01D 25/24* (2006.01)

(52) U.S. Cl.
  CPC .......... *F01D 11/008* (2013.01); *F01D 25/246* (2013.01); *F01D 25/26* (2013.01); *F01D 25/265* (2013.01); *F05D 2220/32* (2013.01); *F05D 2240/11* (2013.01); *F05D 2240/55* (2013.01); *F05D 2300/6033* (2013.01); *Y02T 50/672* (2013.01)

(58) Field of Classification Search
  CPC .... F01D 25/26; F01D 11/006; F05D 2220/32; F05D 2240/11; F05D 2240/55; F05D 2300/6033
  USPC ........................................................ 415/173.1
  See application file for complete search history.

(56) References Cited

U.S. PATENT DOCUMENTS

| | | |
|---|---|---|
| 3,661,197 A | 5/1972 | Peterson |
| 3,990,813 A | 11/1976 | Imai et al. |
| 4,635,896 A | 1/1987 | Baker |
| 5,188,506 A | 2/1993 | Creevy et al. |
| 5,988,975 A | 11/1999 | Pizzi |
| 6,464,456 B2 | 10/2002 | Darolia et al. |
| 6,808,363 B2 | 10/2004 | Darkins, Jr. et al. |
| 6,832,484 B2 | 12/2004 | Hofmann et al. |
| 6,893,214 B2 | 5/2005 | Alford et al. |
| 7,080,513 B2 | 7/2006 | Reichert |
| 7,347,425 B2 | 3/2008 | James |
| 7,360,769 B2 | 4/2008 | Bennett |
| 7,374,395 B2 | 5/2008 | Durocher et al. |
| 7,520,721 B2 | 4/2009 | Hamlin et al. |
| 7,744,096 B2 | 6/2010 | Kono |
| 7,771,159 B2 | 8/2010 | Johnson et al. |
| 7,870,738 B2 | 1/2011 | Zborovsky et al. |
| 8,047,550 B2 | 11/2011 | Behrens et al. |
| 8,047,773 B2 | 11/2011 | Bruce et al. |
| 8,079,600 B2 | 12/2011 | Shojima et al. |
| 8,157,511 B2 | 4/2012 | Pietrobon et al. |
| 8,303,245 B2 | 11/2012 | Foster et al. |
| 8,790,067 B2 | 7/2014 | McCaffrey et al. |
| 2004/0195783 A1 | 10/2004 | Akagi et al. |
| 2008/0069688 A1 | 3/2008 | Harper et al. |
| 2009/0097980 A1 | 4/2009 | Hayasaka et al. |
| 2012/0070272 A1 | 3/2012 | Prehn |
| 2012/0171040 A1* | 7/2012 | Walunj ...................... F01D 5/22 416/220 R |
| 2013/0156550 A1 | 6/2013 | Franks et al. |
| 2013/0202433 A1 | 8/2013 | Hafner |
| 2016/0245108 A1 | 8/2016 | Sippel et al. |

OTHER PUBLICATIONS

GE Aviation, Jefferies Investor Visit, dated May 12, 2014, 78 pg. (p. 32).

* cited by examiner

SPLIT LINE FLOW PATH SEALS

FIELD OF THE DISCLOSURE

The present disclosure relates generally to gas turbine engines, and more specifically to seals used in gas turbine engines.

BACKGROUND

Gas turbine engines are used to power aircraft, watercraft, power generators, and the like. Adjacent components in a gas turbine engine are often separated by a small gap sometimes called a split line. The small gap allows for variations in manufacturing tolerance of the adjacent components and for expansion/contraction of the components that occurs during operation of the gas turbine engine.

The small gaps between adjacent components may be sealed to prevent the leakage of air through the small gaps during operation of the turbine engine. Seals used to block the leakage of air through the small gaps are sometimes designed to account for changes in the dimension of the gap to be closed.

SUMMARY

The present disclosure may comprise one or more of the following features and combinations thereof.

A gas turbine engine assembly may include a first component, a second component, and a seal assembly. The first component and the second component may comprise ceramic matrix materials.

In illustrative embodiments, the first component includes a panel arranged to separate a high pressure zone from a low pressure zone and formed to include a first chamfer surface that extends from a high pressure surface of the first component facing the high pressure zone to a first side surface of the first component. The second component includes a panel arranged to separate the high pressure zone from the low pressure zone and formed to include a second chamfer surface that extends from a high pressure surface of the second component facing the high pressure zone to a second side surface of the first component. The seal assembly may be arranged in a channel formed by the first chamfer and the second chamfer when the first side surface of the first component is arranged in confronting relation to the second side surface of the second component. The seal assembly may include a rod configured to block gasses from passing through the interface of the first side surface included in the first component with the second side surface included in the second component and a rod locator configured to engage the rod to hold the rod in place relative to the first component and the second component.

In illustrative embodiments, the rod of the seal assembly is formed to include a notch into which the rod locator extends. In some embodiments, the notch extends only partway around the rod included in the seal assembly. In some embodiments, the notch extends all the way around the rod included in the seal assembly. In some embodiments, the rod locator is formed to include a cutout that receives a necked-down portion of the rod included in the seal assembly at the notch so that the rod is able to rotate relative to the first component and the second component when used in a gas turbine engine.

In illustrative embodiments, the first chamfered surface has a curved shape as it extends from the high pressure surface of the first component to the first side surface of the first component and the second chamfered surface has a curved shape as it extends from the high pressure surface of the second component to the second side surface of the second component.

In illustrative embodiments, the rod has a generally cylindrical shape.

In illustrative embodiments, the seal assembly includes a bias member configured to push the rod into contact with the first chamfered surface of the first component and the second chamfered surface of the second component. In some embodiments, the rod locator and the bias member are included in a singular component. In some embodiments, the singular component comprises a sheet of metallic material having a substantially constant thickness.

In illustrative embodiments, the rod locator is a singular component that comprises a sheet of material having a substantially constant thickness. In some embodiments, the first component is formed to include a locator slot that receives a portion of the rod locator and the second component is formed to include a locator slot that receives a portion of the rod locator.

According to another aspect of the present disclosure, a gas turbine engine assembly may include a first component, a second component, and a rod arranged in a channel formed between the first component and the second component.

In illustrative embodiments, the first component may include a panel arranged to separate a high pressure zone from a low pressure zone when used in a gas turbine engine. The second component may include a panel arranged to separate the high pressure zone from the low pressure zone when used in a gas turbine engine. The channel may be formed between the first component and the second component that opens toward the high pressure zone when used in a gas turbine engine.

In illustrative embodiments, the assembly may include a rod locator that engages the rod to hold the rod in place relative to the first component and the second component. In some embodiments, the rod is formed to include a notch into which the rod locator extends. In some embodiments, the rod locator is formed to include a cutout that receives a necked-down portion of the rod included in the seal assembly at the notch.

In illustrative embodiments, the assembly may include a bias member that engages the rod. In some embodiments, the assembly may include a rod locator that engages the rod to hold the rod in place relative to the first component and the second component. In some embodiments, the rod locator and the bias member are included in a singular component. In some embodiments, the singular component comprises a sheet of metallic material having a substantially constant thickness.

In illustrative embodiments, the assembly may include a rod locator that engages the rod to hold the rod in place relative to the first component and the second component. In some embodiments, the first component is formed to include a locator slot that receives a portion of the rod locator and the second component is formed to include a locator slot that receives a portion of the rod locator.

In illustrative embodiments, the first component comprises ceramic matrix composite materials and the second component comprises ceramic matrix composite materials.

These and other features of the present disclosure will become more apparent from the following description of the illustrative embodiments.

DETAILED DESCRIPTION

Figure 1:
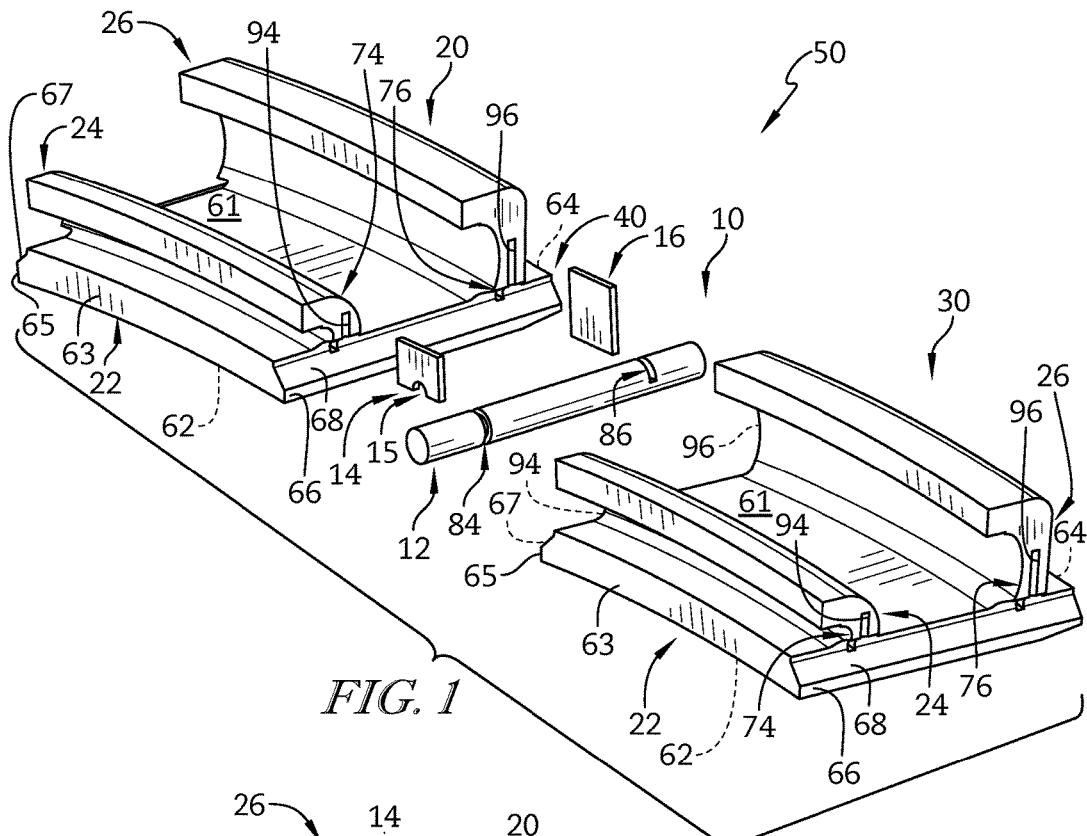
FIG. 1 is an exploded perspective view of a gas turbine engine assembly including a first blade track component, a second blade track component, and a seal assembly adapted to block gasses from passing through a gap formed at an interface between the first blade track component and the second blade track component showing that the seal assembly includes a rod and a plurality of rod locators.

For the purposes of promoting an understanding of the principles of the disclosure, reference will now be made to a number of illustrative embodiments shown in the drawings and specific language will be used to describe the same.

Figure 2:
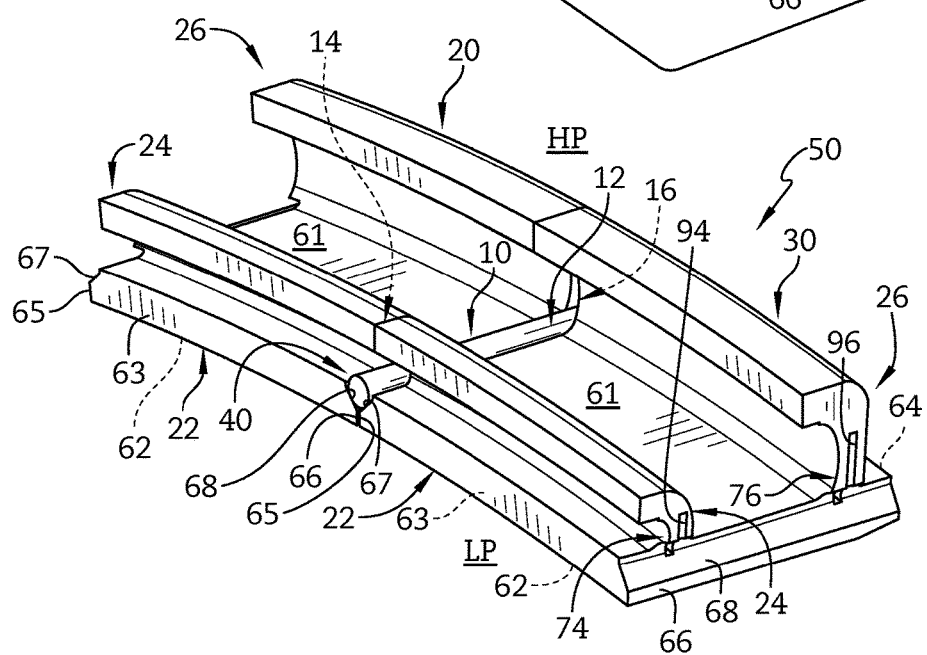
FIG. 2 is a perspective view of the gas turbine engine assembly from FIG. 1 assembled to show that the seal assembly is received in a channel formed between the first blade track component and the second blade track component along radially-outwardly facing surfaces of the first blade track component and the second blade track component.

A seal assembly 10 is adapted to close a gap 11 between first and second adjacent components 20, 30 in a gas turbine engine assembly 50 as shown in FIGS. 1 and 2. The engine assembly 50 separates a high pressure zone HP from a low pressure zone LP within a gas turbine engine. The seal assembly 10 is arranged in a channel 40 formed by the adjacent components 20, 30 that opens toward the high pressure zone HP. The seal assembly 10 includes a rod 12 illustratively having a round cross sectional profile as shown in FIG. 1. Gasses in the high pressure zone HP act on the rod 12 of the seal assembly 10 to push the rod 12 into contact with the components 20, 30 so that the rod 12 resists gasses moving through the gap 11 between the first component 20 and the second component 30.

Each of the components 20, 30 are substantially similar and each includes a panel 22, a first hanger 24, and a second hanger 26 as shown in FIGS. 1 and 2. The panel 22 separates the high pressure zone HP from the low pressure zone LP. The first and the second hangers 24, 26 are configured to be coupled to structure surrounding the gas turbine engine assembly 50. In the illustrative embodiment, the components 20, 30 are blade track segments made from ceramic matrix materials that may be used with other blade track segments to provide a ring that extends around rotating turbine wheels used in gas turbine engines. However, the components 20, 30 may be made from other materials and/or may be adapted for use as combustor tiles included in the combustor of a gas turbine engine or as heat shields included in other sections of a gas turbine engine.

The panel 22 of the components 20, 30 is illustratively formed to include a high pressure surface 61 that faces the high pressure zone HP and a low pressure surface 62, opposite the high pressure surface 61, that faces the low pressure zone LP as shown in FIG. 2. The panel 22 is also formed to include a forward side surface 63, an aft side surface 64, a left side surface 65, and a right side surface 66 as shown in FIGS. 1 and 2. Additionally, in the illustrative embodiment, the panel 22 is formed to include a left chamfer surface 67 that extends at an angle generally from the high pressure surface 61 to the left side surface 65 of the panel 22 and a right chamfer surface 68 that extends at an angle generally from the high pressure surface 61 to the right side surface 66 of the panel 22. The chamfer surfaces 67, 68 may be generally flat or barreled (curved).

Figure 3:
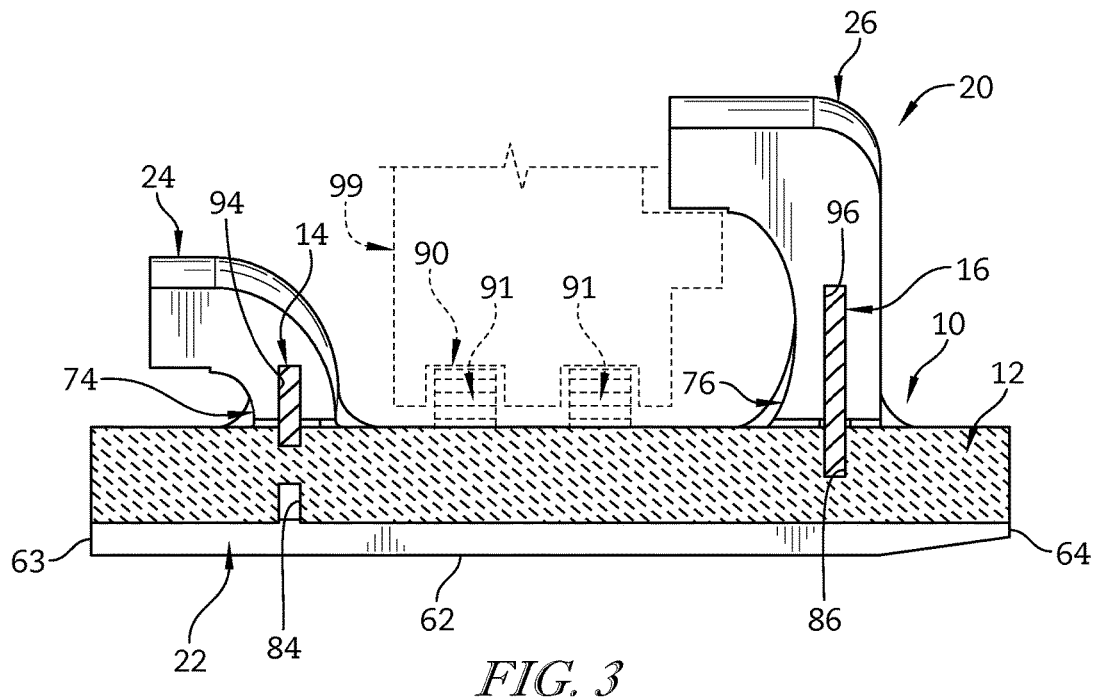
FIG. 3 is a cross sectional view of FIG. 2 showing coil springs providing an optional biasing member for pushing the rod of the seal assembly into contact with the blade track components.

When assembled, the first component 20 and the second component 30 are arranged adjacent to one another so that the right side surface 66 of the first component 20 is in confronting relation with the left side surface 65 of the second component 30 as shown in FIG. 2. The right chamfer surface 68 of the first component 20 then cooperates with the left chamfer surface 67 of the second component 30 to create the channel 40 opening entirely toward the high pressure zone HP that receives the seal assembly 10 as shown in FIG. 3. The chamfer surfaces 67, 68 extend along the corresponding left and right side surfaces 65, 66 from the forward surface 63 to the aft surface 64; accordingly, the channel 40 extends from the forward surface 63 to the aft surface 64 of the panels 22 included in the first and the second components 20, 30. The channel 40 is illustratively shaped with straight sides forming a generally triangular space for the seal assembly 10 but may have curved or otherwise shaped sides that provide a space for the seal assembly 10.

The first and the second hangers 24, 26 are integral with the panels 22 of the first and the second components 20, 30 and are adapted for coupling the panels 22 of the first and the second component 20, 30 with structure surrounding the gas turbine engine assembly 50 as shown in FIGS. 1 and 2. In the illustrative embodiment, the first and the second hangers 24, 26 have a generally L-shape adapted to hang from brackets in a support structure. In other embodiments, the first and the second hangers may be dovetail shaped, may have pin-receiving holes, or have any other suitable shape for coupling the assembly 50 with other structures.

In addition to providing means for attaching the assembly 50 to other structures, the first and second hangers 24, 26 each extend over a portion of the channel 40 to provide retention tabs 74, 76 as shown in FIG. 2. The retention tabs 74, 76 provide features that block the seal assembly 10 from movement out of the channel 40 toward the high pressure zone HP (e.g. when the zones HP, LP around the assembly 50 are not pressurized by operation of a gas turbine engine). In some embodiments, the retention tabs 74, 76 may be independent of the first and the second hangers 24, 26 while still being integrated with the panels 22 of the first and the second components 20, 30.

The seal assembly 10 illustratively includes the rod 12, a first rod locator 14, and a second rod locator 16 as shown in FIG. 1. The rod 12 is arranged in the channel 40 and is pushed into contact with the first and second components 20, 30 by pressure in the high pressure zone when the engine assembly 50 is used in an operating gas turbine engine to seal the interface 11 between the first and the second components 20, 30. The first and the second rod locators 14, 16 are configured to hold the rod 12 in the channel 40 when the engine assembly 50 is not in an operating gas turbine engine such that there is no high pressure zone HP pushing the rod 12 into place.

The rod 12 is illustratively sized to extend from the forward surface 63 to the aft surface 64 of the panels 22 included in the first and the second components 20, 30 as shown in FIGS. 1 and 2. The rod 12 illustratively has a round cross sectional profile but may have an elliptical cross sectional profile or a polygonal cross sectional profile. The rod 12 comprises ceramic matrix composite materials but may comprise ceramic monolithic materials, metallic materials, or other suitable materials.

The rod 12 engages chamfered surfaces 67, 68 of the panels 22 included in the first and the second components 20, 30 to block gasses from passing through the interface 11 between the first and the second components 20, 30 as shown in FIG. 2. In the illustrative embodiment, the rod 12 is formed to include a first notch 84 and a second notch 86 as shown in FIG. 1. The first notch receives a portion of the first rod locator 14. The second notch 86 receives a portion of the second rod locator 16. In other embodiments, any number of notches may be formed in the rod 12. In some embodiments, no notches are formed in the rod 12 as different locating features may be included in the components 20, 30 or in the rod locators 14, 16.

The first notch 84 illustratively extends all the way around the rod 12 as shown in FIG. 1. The first notch receives a portion of the first rod locator 14 so that the rod 12 is axially located by the first rod locator 14 while remaining free to rotate relative to the first rod locator 14. In some embodiments, the first notch 84 may extend only partway around the rod 12.

The second notch 86 illustratively extends only partway around the rod 12 as shown in FIG. 1. The second notch 86 receives a portion of the second rod locator 16 so that the rod 12 is axially located by the second rod locator 16 and is blocked from excess rotation relative to the second rod locator 16. However, the second notch 86 and the second rod locator 16 are sized to allow a predetermined amount of rod 12 rotation. In some embodiments, the second notch 86 may extend all the way around the rod 12.

The first rod locator 14 is illustratively formed from a material having a generally constant thickness as shown in FIG. 1. The first rod locator 14 extends from the first component 20 and the second component 30 over the channel 40 to block movement of the rod 12 out of the channel 40. The first rod locator 14 extends out from a slots 94 formed in the first component 20 and the second component 30. The slots 94 are illustratively formed in the first hanger 24 and the panel 22 included in each of the first and the second components 20, 30. The first rod locator 14 is formed to include a cutout 15 that receives a necked down portion of the rod 12 at the first notch 84. The first rod locator 14 comprises metallic materials but may comprise ceramic-containing materials or other suitable materials.

The second rod locator 16 is illustratively formed from a material having a generally constant thickness as shown in FIG. 1. The second rod locator 16 extends from the first component 20 and the second component 30 over the channel 40 to block movement of the rod 12 out of the channel 40. The second rod locator 16 extends out from a slots 96 formed in the first component 20 and the second component 30. The slots 96 are illustratively formed in the second hanger 26 and the panel 22 included in each of the first and the second components 20, 30. The second rod locator 16 is generally rectangular and extends through the second notch 86 formed in the rod 12. The second rod locator 16 comprises metallic materials but may comprise ceramic-containing materials or other suitable materials.

Figure 4:
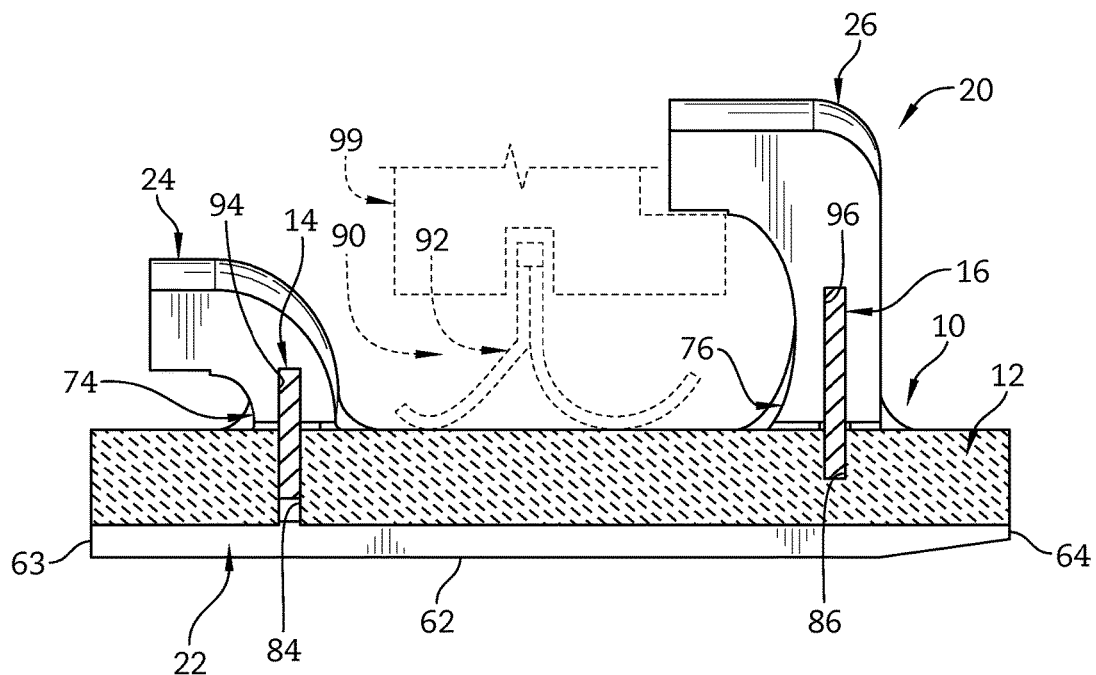
FIG. 4 is a cross sectional view of FIG. 2 showing a bent strip spring providing an optional biasing member for pushing the rod of the seal assembly into contact with the blade track components.

In some embodiments, the seal assembly 10 may include an optional biasing member 90 as shown in phantom in FIGS. 3 and 4. The biasing member 90 may be configured to push the rod 12 into contact with the first chamfered surface 63 of the first component 20 and the second chamfered surface 64 of the second component 30. While two exemplary options for biasing member 90 are shown, any suitable member configured to bias the rod 12 may be included.

As shown in FIG. 3, the optional biasing member 90 may be one or more coil springs 91. The coil springs 91 may be compression springs that react against supporting structure 99 around the engine assembly 50. In other embodiments, the coil springs 91 may react against the attachment features 24, 26 or other parts of the engine assembly 50.

As shown in FIG. 4, the optional biasing member 90 may be one or more bent strip springs 92. The bent strip springs 92 may be compression springs that react against supporting structure 99 around the engine assembly 50. In other embodiments, the bent strip springs 92 may react against the attachment features 24, 26 or other parts of the engine assembly 50.

Figure 5:
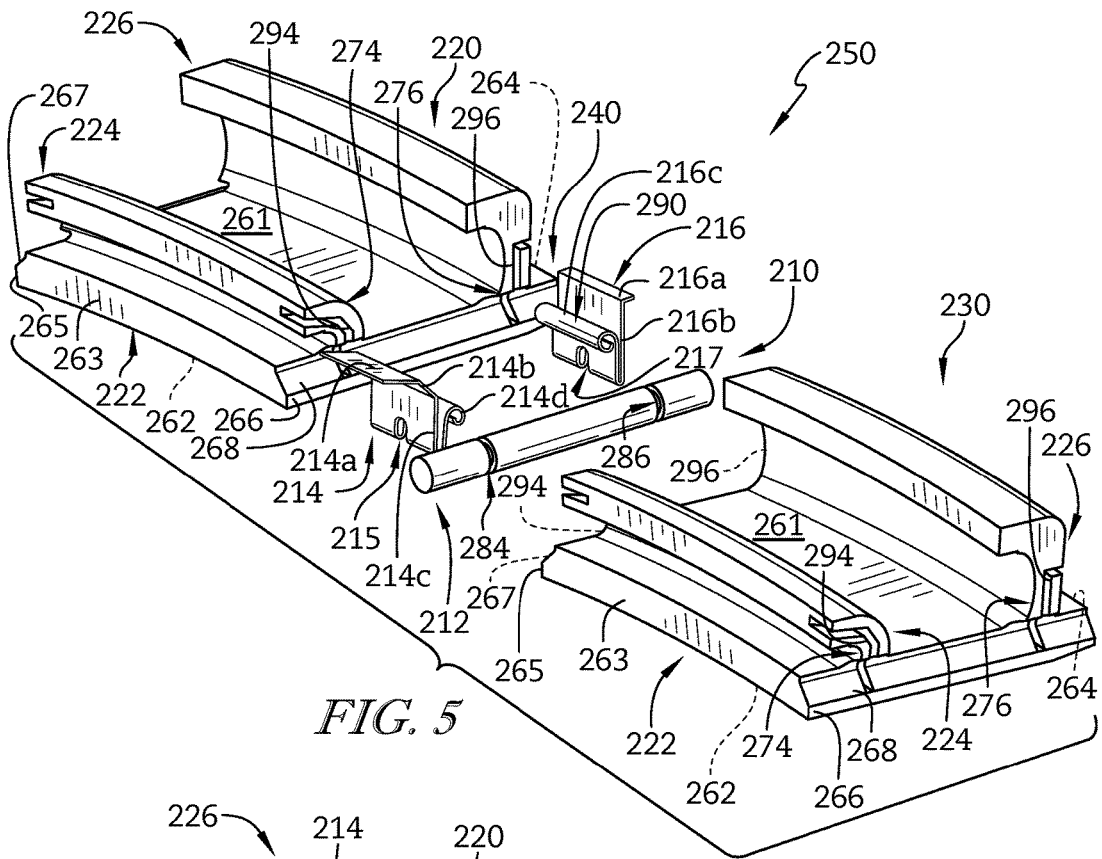
FIG. 5 is an exploded perspective view of a second gas turbine engine assembly including a first blade track component, a second blade track component, and a seal assembly adapted to block gasses from passing through a gap formed at an interface between the first lade track component and the second blade track component showing that the seal assembly includes a rod and a plurality of rod locators.
Figure 6:
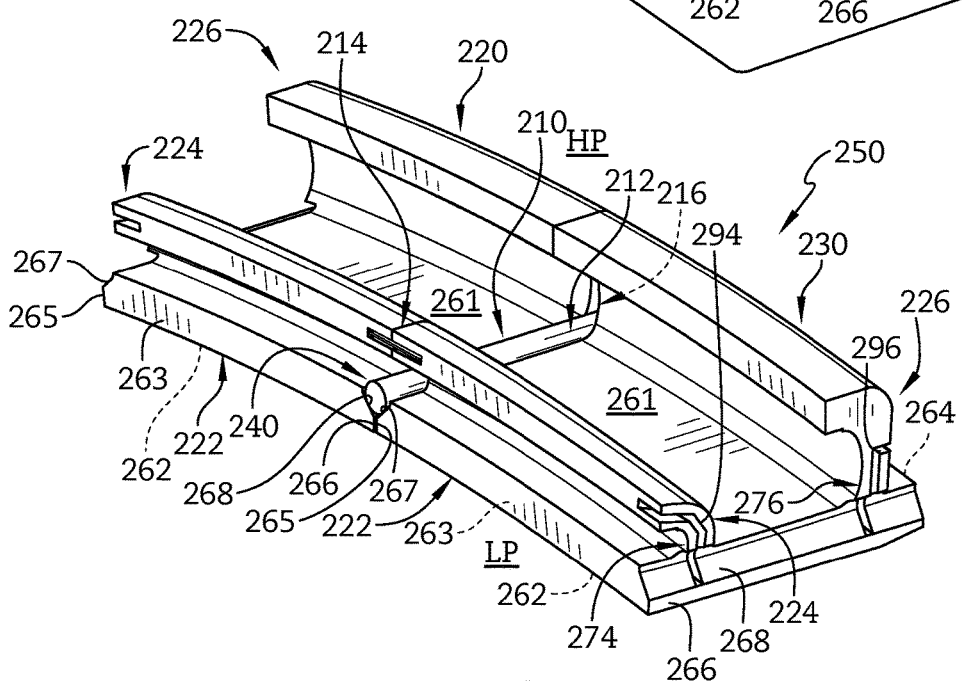
FIG. 6 is a perspective view of the gas turbine engine assembly from FIG. 5 assembled to show that the seal assembly is received in a channel formed between the first blade track component and the second blade track component along radially-outwardly facing surfaces of the first blade track component and the second blade track component.

A second seal assembly 210 is adapted to close a gap 211 between first and second adjacent components 220, 230 in a gas turbine engine assembly 250 as shown in FIGS. 5 and 6. The engine assembly 250 separates a high pressure zone HP from a low pressure zone LP within a gas turbine engine. The seal assembly 210 is arranged in a channel 240 formed by the adjacent components 220, 230 that opens toward the high pressure zone HP. The seal assembly 210 includes a rod 212 illustratively having a round cross sectional profile as shown in FIG. 5. Gasses in the high pressure zone HP act on the rod 212 of the seal assembly 210 to push the rod 212 into contact with the components 220, 230 so that the rod 212 resists gasses moving through the gap 211 between the first component 220 and the second component 230.

Each of the components 220, 230 are substantially similar and each includes a panel 222, a first hanger 224, and a second hanger 226 as shown in FIGS. 5 and 6. The panel 222 separates the high pressure zone HP from the low pressure zone LP. The first and the second hangers 224, 226 are configured to be coupled to structure surrounding the gas turbine engine assembly 250. In the illustrative embodiment, the components 220, 230 are blade track segments made from ceramic matrix materials that may be used with other blade track segments to provide a ring that extends around rotating turbine wheels used in gas turbine engines. However, the components 220, 230 may be made from other materials and/or may be adapted for use as combustor tiles included in the combustor of a gas turbine engine or as heat shields included in other sections of a gas turbine engine.

The panel 222 of the components 220, 230 is illustratively formed to include a high pressure surface 261 that faces the high pressure zone HP and a low pressure surface 262, opposite the high pressure surface 261, that faces the low pressure zone LP as shown in FIG. 6. The panel 222 is also formed to include a forward side surface 263, an aft side surface 264, a left side surface 265, and a right side surface 266 as shown in FIGS. 5 and 6. Additionally, in the illustrative embodiment, the panel 222 is formed to include a left chamfer surface 267 that extends at an angle generally from the high pressure surface 261 to the left side surface 265 of the panel 222 and a right chamfer surface 268 that extends at an angle generally from the high pressure surface 261 to the right side surface 266 of the panel 222. The chamfer surfaces 226, 268 may be generally flat or barreled (curved).

When assembled, the first component 220 and the second component 230 are arranged adjacent to one another so that the right side surface 266 of the first component 220 is in confronting relation with the left side surface 265 of the second component 230 as shown in FIG. 6. The right chamfer surface 268 of the first component 220 then cooperates with the left chamfer surface 267 of the second component 230 to create the channel 240 opening entirely toward the high pressure zone HP that receives the seal assembly 210 as shown in FIG. 6. The chamfer surfaces 267, 268 extend along the corresponding left and right side surfaces 265, 266 from the forward surface 263 to the aft surface 264; accordingly, the channel 240 extends from the forward surface 263 to the aft surface 264 of the panels 222 included in the first and the second components 220, 230. The channel 240 is illustratively shaped with straight sides forming a generally triangular space for the seal assembly 210 but may have curved or otherwise shaped sides that provide a space for the seal assembly 210.

The first and the second hangers 224, 226 are integral with the panels 222 of the first and the second components 220, 230 and are adapted for coupling the panels 222 of the first and the second component 220, 230 with structure surrounding the gas turbine engine assembly 250 as shown in FIGS. 5 and 6. In the illustrative embodiment, the first and the second hangers 224, 226 have a generally L-shape adapted to hang from brackets in a support structure. In other embodiments, the first and the second hangers may be dovetail shaped, may have pin-receiving holes, or have any other suitable shape for coupling the assembly 250 with other structures.

In addition to providing means for attaching the assembly 250 to other structures, the first and second hangers 224, 226 each extend over a portion of the channel 240 to provide retention tabs 274, 276 as shown in FIG. 6. The retention tabs 274, 276 provide features that block the seal assembly 210 from movement out of the channel 240 toward the high pressure zone HP (e.g. when the zones HP, LP around the assembly 250 are not pressurized by operation of a gas turbine engine). In some embodiments, the retention tabs 274, 276 may be independent of the first and the second hangers 224, 226 while still being integrated with the panels 222 of the first and the second components 220, 230.

The seal assembly 210 illustratively includes the rod 212, a first rod locator 214, and a second rod locator 216 as shown in FIG. 5. The rod 212 is arranged in the channel 240 and is pushed into contact with the first and second components 220, 230 by pressure in the high pressure zone when the engine assembly 250 is used in an operating gas turbine engine to seal the interface 211 between the first and the second components 220, 230. The first and the second rod locators 214, 216 are configured to hold the rod 212 in the channel 240 when the engine assembly 250 is not in an operating gas turbine engine such that there is no high pressure zone HP pushing the rod 212 into place.

The rod 212 is illustratively sized to extend from the forward surface 263 to the aft surface 264 of the panels 222 included in the first and the second components 220, 230 as shown in FIGS. 5 and 6. The rod 212 illustratively has a round cross sectional profile but may have an elliptical cross sectional profile or a polygonal cross sectional profile. The rod 212 comprises ceramic matrix composite materials but may comprise ceramic monolithic materials, metallic materials, or other suitable materials.

The rod 212 engages chamfered surfaces 267, 268 of the panels 222 included in the first and the second components 220, 230 to block gasses from passing through the interface 11 between the first and the second components 220, 230 as shown in FIG. 6. In the illustrative embodiment, the rod 212 is formed to include a first notch 284 and a second notch 286 as shown in FIG. 1. The first notch receives a portion of the first rod locator 214. The second notch 286 receives a portion of the second rod locator 216. In other embodiments, any number of notches may be formed in the rod 212. In some embodiments, no notches are formed in the rod 212 as different locating features may be included in the components 220, 230 or in the rod locators 214, 216.

The first notch 284 and the second notch 286 illustratively extend all the way around the rod 212 as shown in FIG. 5. The first notch 284 receives a portion of the first rod locator 214 so that the rod 212 is axially located by the first rod locator 214 while remaining free to rotate relative to the first rod locator 214. Similarly, the second notch 286 receives a portion of the second rod locator 216 so that the rod 212 is axially located by the second rod locator 216 while remaining free to rotate relative to the second rod locator 216. In some embodiments, the first and/or the second notch 284, 286 may extend only partway around the rod 212.

Figure 8:
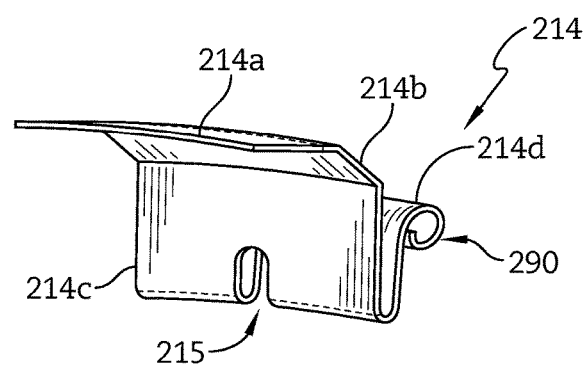
FIG. 8 is an enlarged perspective view of a rod locator included in the seal assembly of FIGS. 5-7.

The first rod locator 214 is illustratively formed from a material having a generally constant thickness as shown in FIGS. 5 and 8. The first rod locator 214 extends from the first component 220 and the second component 230 over the channel 240 to block movement of the rod 212 out of the channel 240. The first rod locator 214 extends out from a slots 294 formed in the first component 220 and the second component 230. The slots 294 are illustratively formed in the first hanger 224 and the panel 222 included in each of the first and the second components 220, 230. The first rod locator 214 is formed to include a cutout 215 that receives a necked down portion of the rod 212 at the first notch 284. The first rod locator 214 comprises metallic materials but may comprise ceramic-containing materials or other suitable materials.

Figure 7:
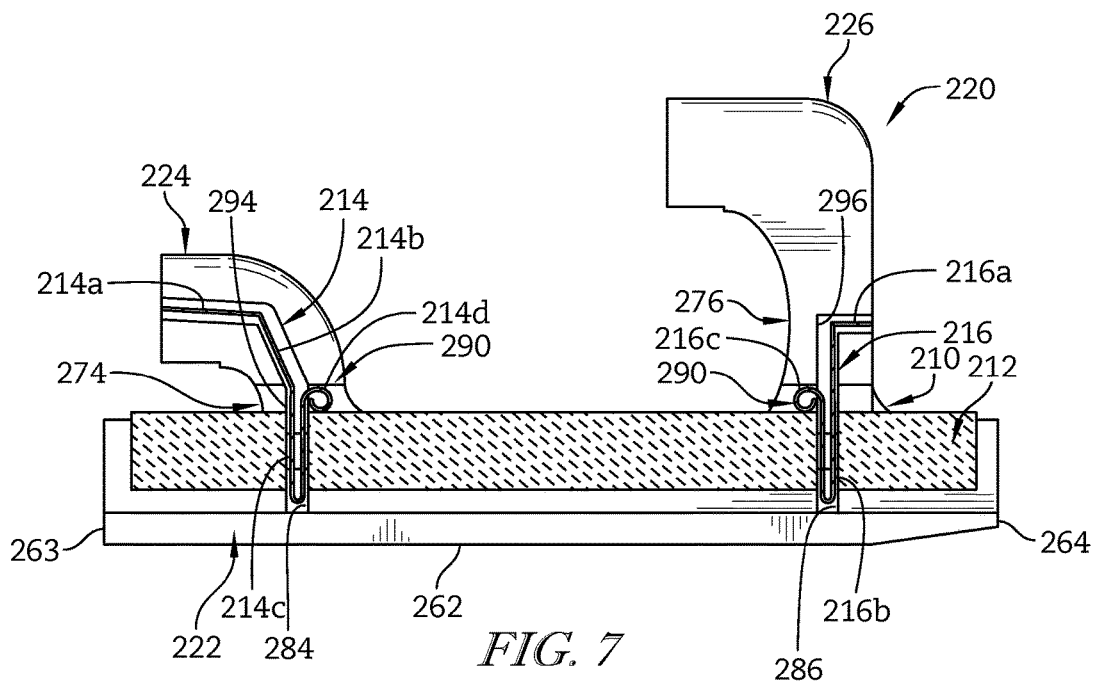
FIG. 7 is a cross sectional view of FIG. 6 showing that the rod locators of the seal assembly are formed to include integrated springs that provide biasing members for pushing the rod into contact with the blade track components.

The illustrated first rod locator 214 is shaped to include a first section 214a, a second section 214b, a third section 214c, and a fourth section 214d as shown in FIGS. 7 and 8. The first section 214a extends generally in an axial direction in a portion of the slot 294 formed in the first hanger 224. The second section 214b extends both axially and radially from the first section 214a toward the panel 222 in a portion of the slot 294 formed in the first hanger 224. The third portion 214c has a U-shaped cross sectional profile and extends generally in a radial direction from the second section 214b into the channel 240 in a portion of the slot 294 formed in the first hanger 224 and the panel 222. The cutout 215 is formed in the third portion 214c. The fourth portion 214d is illustratively rolled and engages the first hanger 224.

In the illustrative embodiment, the fourth portion 214d provides a biasing member 290 as suggested in FIG. 7. The biasing member 290 may be configured to push the rod 212 into contact with the first chamfered surface 263 of the first component 220 and the second chamfered surface 264 of the second component 230. In other embodiments, the biasing member 290 may have a different shape and may not be integral with the rest of the first rod locator 214.

In the illustrative embodiment, the sections 214a-d of the first rod locator 214 extend from one another and are joined at bends within the first rod locator 214 so that the first rod locator 214 is a singular, one-piece, integrated component as shown in FIG. 8. In other embodiments, the sections 214a-d of the first rod locator 214 may be fabricated from multiple pieces joined through a welding, brazing, crimping or other joining process.

The second rod locator 216 is illustratively formed from a material having a generally constant thickness as shown in FIGS. 5 and 7. The second rod locator 216 extends from the first component 220 and the second component 230 over the channel 240 to block movement of the rod 212 out of the channel 240. The second rod locator 216 extends out from a slots 296 formed in the first component 220 and the second component 230. The slots 296 are illustratively formed in the second hanger 226 and the panel 222 included in each of the first and the second components 220, 230. The second rod locator 216 is formed to include a cutout 217 that receives a necked down portion of the rod 212 at the second notch 286. The second rod locator 216 comprises metallic materials but may comprise ceramic-containing materials or other suitable materials.

The illustrated second rod locator 216 is shaped to include a first section 216a, a second section 216b, and a third section 216c as shown in FIG. 7. The first section 216a extends generally in an axial direction in a portion the slot 294 formed in the second hanger 226. The second section 216c has a U-shaped cross sectional profile and extends generally in a radial direction from the first section 216a into the channel 240 in a portion of the slot 294 formed in the second hanger 226 and the panel 222. The cutout 217 is formed in the second portion 216b. The third portion 216c is illustratively rolled and engages the second hanger 226.

In the illustrative embodiment, the third portion 216c provides a biasing member 290 as suggested in FIG. 7. The biasing member 290 may be configured to push the rod 212 into contact with the first chamfered surface 263 of the first component 220 and the second chamfered surface 264 of the second component 230. In other embodiments, the biasing member 290 may have a different shape and may not be integral with the rest of the second rod locator 216.

In the illustrative embodiment, the sections 216a-c of the second rod locator 216 extend from one another and are joined at bends within the second rod locator 216 so that the second rod locator 216 is a singular, one-piece, integrated component as shown in FIGS. 5 and 7. In other embodiments, the sections 216a-c of the second rod locator 216 may be fabricated from multiple pieces joined through a welding, brazing, crimping or other joining process.

The present disclosure provides apparatuses and methods for sealing between components (end walls, blade tracks, etc) where the use of strip seals could create challenges for ceramic matrix composite (CMC) components or other components. The illustrative design configuration comprises a cylindrical rod to act as the sealing element between two components. The two components are arranged adjacent to one another around the flow path annulus of the turbine. The seal is pressure activated so the high pressure air forces the sealing rod to contact a surface on each component and restricts the flow of air from the high pressure side of the seal to the low pressure side of the seal. The seal surfaces on the adjacent components are arranged along the radially outward edge of the respective components. The sealing surfaces are machined chamfer surfaces in the illustrated example.

The gaps between components may be designed to capture all relative mechanical and thermal motion of the components so the gaps do not open up and allow the sealing rod an escape path. Conversely, the design may allow the gaps to close as well without binding.

In illustrative embodiments, the rod may need to be capable of withstanding high temperatures (>2100 deg F.) and may need to holding its shape for the life of the sealed components. The rod may need to be made of a similar material to the CMC. An oxide CMC material system may be a candidate since the mechanical loading on the rod is likely to be low and it would be naturally oxidation resistant. A SiC CMC material would be capable of handling the highest temperatures, but may need to be designed to minimize the recession of the material. If cooling air leaking around the seal is sufficient to keep the temperature of the rod down, then a high temperature alloy may be sufficient.

In some embodiments, rod locators (sometimes called strip seals) may be used conjunction with the rod. The rod locators can be used to axially locate the rod. In such embodiments, the rod may include notch (sometimes called groove features) to constrain the rod. Notches may run completely around the circumference of the rod, which will allow the rod to rotate as necessary. Notches may alternatively be cuts that extend some ratio thru the diameter of the rod.

Machined features in the blade track components of the present disclosure may be simpler to produce than a thin groove that may be used with a strip seal. Strip seal grooves can take machining time and special cutting tools may need to be used. The opened face features of the chamfer can be made with traditional cutting tools and can be machined very quickly. The thin strip seal grooves can also be a source of thermal stresses. The angled sealing faces described herein may reduce thermal gradients in the CMC seal segments or endwalls.

In the included embodiments, a coating may be applied using Air Plasma Spray (APS). The machined features on each blade track segment have a direct line of sight to all surfaces with ample room for rotating the spray gun. This may be desired since the SiC/SiC CMC component may require all surfaces to be coated to meet life requirements.

The pressure load transfer from the sealing element to the CMC blade track may be low in the disclosed configurations. The rod may be forced onto the angled faces of the seal segments reducing loads normal to the laminate, which reduces the amount of Interlaminar Tensile (ILT) strength capability needed in this area.

The configurations disclosed herein may allow for a simple installation into the engine ring for blade tracks. The seal and the blade track can be installed axially. With the disclosed lap joint and rod configuration once the blade tracks are installed axially and locked into position when the blade tracks are constrained. The rod is also fully contained.

The sealing rod allows for relative motion between the two blade tracks (circumferential, axial, radial, tilting). This motion allows for use of rod along flow path and strip seals away from the hot portions of the seal segment.

Bias members may apply an initial sealing force increasing the effectiveness of the seal at lower pressure ratios. A bias member or spring may be fit into the design space of a forward hanger style seal segment.

A bias member or spring component may be integral with the rod locator as described herein so as to maintain, by means of a mechanical load, rod engagement at all conditions. In some such embodiments, the rod locator may comprise a sheet metal strip seal with an upside down "U" shaped cutout to fit over a circumferential groove in the rod.

Other mating geometries are also possible. These could include, but are not limited to no cut-out in the sheet metal seal mating with a chordal slot in the rod, a cut-out in the sheet metal seal mating with a chordal slot in the rod, and/or no cut-out in the sheet metal seal mating with separate forward and aft rod seals.

In the present disclosure, the rod seal locators are shown as being fabricated from one piece with crimps or bends where needed. Other one-piece sheet metal forming techniques could also be employed to manufacture the rod locators. For example, the rod locators could be fabricated from multiple pieces joined through a welding, brazing, crimping or other joining process.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine assembly, the assembly comprising
    a first component comprising ceramic matrix materials, the first component including a panel arranged to separate a high pressure zone from a low pressure zone and formed to include a first chamfer surface that extends from a high pressure surface of the first component facing the high pressure zone to a first side surface of the first component,
    a second component comprising ceramic matrix materials, the second component including a panel arranged to separate the high pressure zone from the low pressure zone and formed to include a second chamfer surface that extends from a high pressure surface of the second component facing the high pressure zone to a second side surface of the first component,
    a seal assembly arranged in a channel formed by the first chamfer and the second chamfer when the first side surface of the first component is arranged in confronting relation to the second side surface of the second component, the seal assembly including a rod configured to block gasses from passing through the interface of the first side surface included in the first component with the second side surface included in the second component and a rod locator configured to engage the rod to hold the rod in place relative to the first component and the second component,
    wherein the seal assembly includes a bias member configured to push the rod into contact with the first chamfered surface of the first component and the second chamfered surface of the second component, and
    wherein the rod locator and the bias member are included in a singular component.

2. The assembly of claim 1, wherein the rod of the seal assembly is formed to include a notch into which the rod locator extends.

3. The assembly of claim 2, wherein the notch extends only partway around the rod included in the seal assembly.

4. The assembly of claim 2, wherein the notch extends all the way around the rod included in the seal assembly.

5. The assembly of claim 4, wherein the rod locator is formed to include a cutout that receives a necked-down portion of the rod included in the seal assembly at the notch so that the rod is able to rotate relative to the first component and the second component when used in a gas turbine engine.

6. The assembly of claim 1, wherein the first chamfered surface has a curved shape as it extends from the high pressure surface of the first component to the first side surface of the first component and the second chamfered surface has a curved shape as it extends from the high pressure surface of the second component to the second side surface of the second component.

7. The assembly of claim 1, wherein the rod has a generally cylindrical shape.

8. The assembly of claim 1, wherein the singular component comprises a sheet of metallic material having a substantially constant thickness.

9. The assembly of claim 1, wherein the rod locator is a singular component that comprises a sheet of material having a substantially constant thickness.

10. The assembly of claim 9, wherein the first component is formed to include a locator slot that receives a portion of the rod locator and the second component is formed to include a locator slot that receives a portion of the rod locator.

11. A gas turbine engine assembly, the assembly comprising
    a first component including a panel arranged to separate a high pressure zone from a low pressure zone when used in a gas turbine engine,
    a second component including a panel arranged to separate the high pressure zone from the low pressure zone when used in a gas turbine engine,
    a rod arranged in a channel formed between the first component and the second component that opens toward the high pressure zone when used in a gas turbine engine,
    further comprising a bias member that engages the rod, and
    further comprising a rod locator that engages the rod to hold the rod in place relative to the first component and the second component, and the rod locator and the bias member are included in a singular component.

12. The assembly of claim 11, further comprising a rod locator that engages the rod to hold the rod in place relative to the first component and the second component, and the rod is formed to include a notch into which the rod locator extends.

13. The assembly of claim 12, wherein the rod locator is formed to include a cutout that receives a necked-down portion of the rod included in the seal assembly at the notch.

14. The assembly of claim 11, wherein the singular component comprises a sheet of metallic material having a substantially constant thickness.

15. The assembly of claim 11, further comprising a rod locator that engages the rod to hold the rod in place relative to the first component and the second component, and the first component is formed to include a locator slot that receives a portion of the rod locator and the second component is formed to include a locator slot that receives a portion of the rod locator.

16. The assembly of claim 11, wherein the first component comprises ceramic matrix composite materials and the second component comprises ceramic matrix composite materials.

* * * * *